Jan. 5, 1971  J. L. BRATTON  3,551,982

PLUMBING PREFABRICATION FIXTURE

Filed Sept. 5, 1968  3 Sheets-Sheet 1

INVENTOR
JERRY L BRATTON
BY
Woodard, Weikart, Emhardt ; Naughton
Attorneys

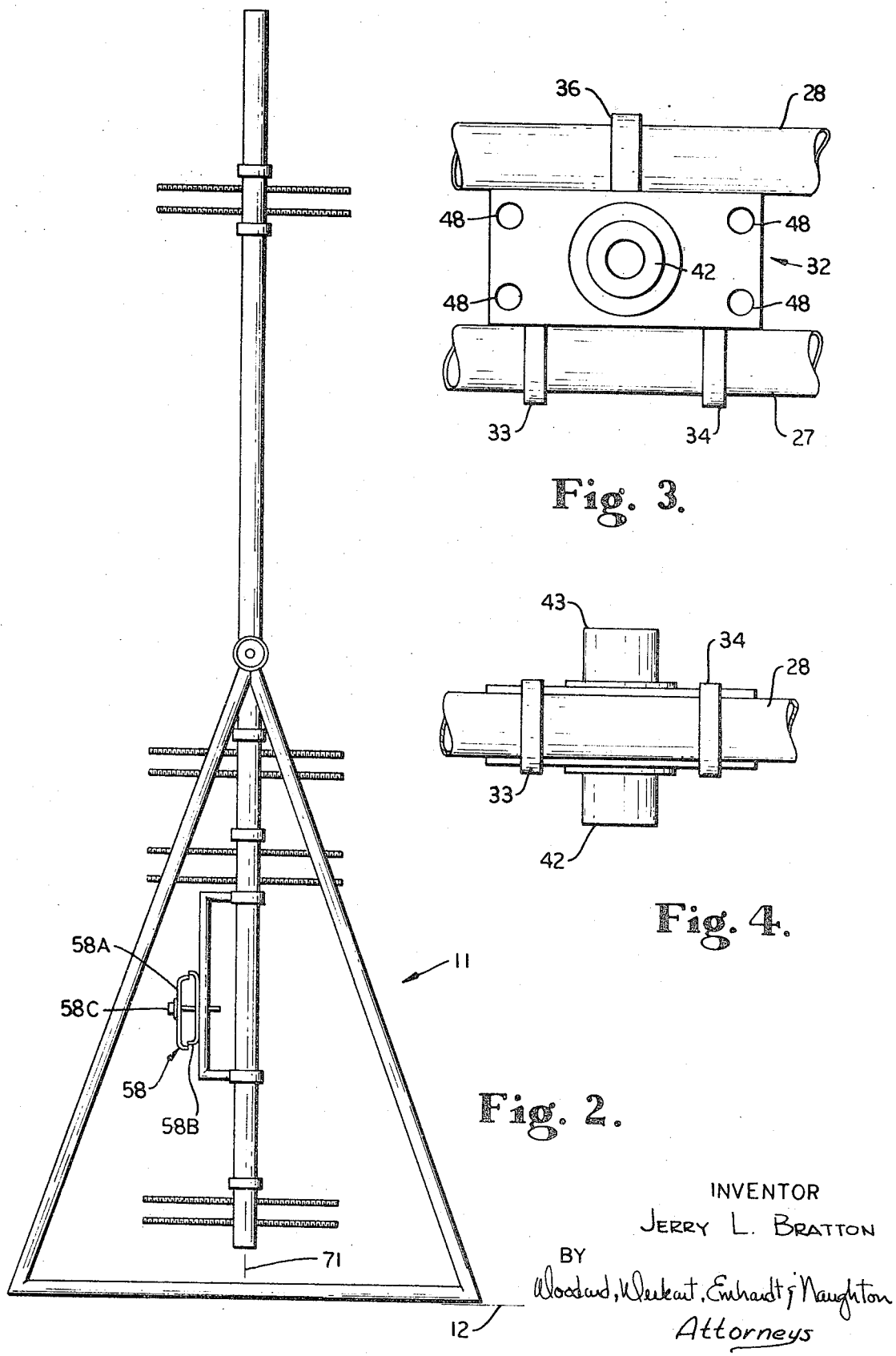

Jan. 5, 1971          J. L. BRATTON          3,551,982

PLUMBING PREFABRICATION FIXTURE

Filed Sept. 5, 1968          3 Sheets-Sheet 3

INVENTOR
JERRY L. BRATTON
BY
Woodard, Weikart, Emhardt & Naughton
Attorneys

United States Patent Office 3,551,982
Patented Jan. 5, 1971

1

3,551,982
PLUMBING PREFABRICATION FIXTURE
Jerry L. Bratton, 3237 Winton Ave.,
Indianapolis, Ind. 46224
Filed Sept. 5, 1968, Ser. No. 757,735
Int. Cl. B23p *19/00;* B25b *1/20;* B23g *1/04*
U.S. Cl. 29—200                               9 Claims

ABSTRACT OF THE DISCLOSURE

A rectangular frame of pipe, stand-mounted to pivot on a horizontal axis, has a plurality of horizontal pipes slidably mounted on the vertical side pipes of the frame. Individual fixtures and clamps apertured to receive tubing for supply to various plumbing fixtures, are mounted to the horizontal pipes and horizontally slidable thereon, the various pipes and tubing clamps and receivers being thereby disposable at locations for lavatories, water closets, bath tubs, and shower heads to enable prefabrication of the water supply tubing to accommodate such plumbing fixtures.

BACKGROUND OF THE INVENTION

Field of the invention

This invention relates generally to prefabrication fixtures, and more particularly to one for prefabrication of plumbing.

Description of the prior art

There is a myriad of devices known for prefabrication. Even for plumbing components there are some devices known. A good example is the United States Pat. No. 2,774,134, issued to Smith et al. on Dec. 18, 1956. Other fixtures are shown in patents as follows: 414,770, Hanika, Nov. 12, 1889; 929,045; Stewart, July 27, 1909; 1,060,-430, Crecelius, Apr. 29, 1913; 2,679,872; Sutcliffe, July 1, 1954; 2,682,244, Fortner, July 29, 1954; 2,808,801; Ulrichs, Oct. 8, 1957; 3,086,787, Boser, Apr. 23, 1963.

In spite of this extensive array of prior art patents, there has remained a need for some way to quickly and easily prefabricate plumbing for use in multiple-dwelling structures, particularly water supply lines for apartments. One aspect of the matter which I believe to be important is that such a fixture should make it possible for a plumber to approach his work in the manner to which he has become accustomed, particularly for on-the-job installations in a building wall, and yet be able to use these techniques apart from the wall itself at a more convenient location. The present invention is directed toward fulfilling the current needs of the industry.

SUMMARY OF THE INVENTION

Described briefly, in a typical embodiment of the present invention, a frame having vertical guide means thereon has horizontal guide means slidably mounted to the vertical guide means, the horizontal guide means having plumbing tube receiving members thereon horizontally slidable for location thereof as desired to facilitate assembly of plumbing lines needed for a selection of plumbing fixtures.

BRIEF DESCRIPTION OF THE DRAWINGS

The full nature of the invention will be understood from the accompanying drawings and the following description and claims.

2

FIG. 2 is a side elevational view thereof on a larger scale.

FIG. 3 is a much enlarged front elevational view of a tube receiver fixture employed in the assembly fixture.

FIG. 4 is a top plan view of the tube receiver fixture.

Figure 5:
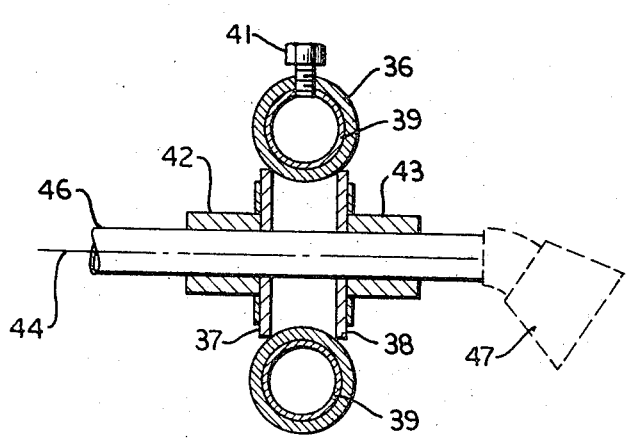

FIG. 5 is a section taken at line 5—5 in FIG. 3 and viewed in the direction of the arrows.

Figure 6:
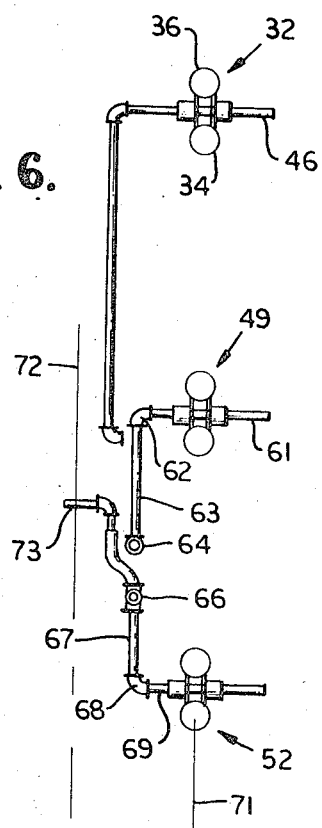

FIG. 6 is an elevational view similar to FIG. 2 but omitting the frame and showing some of the tube receiver fixtures with tubing received therein and other tubing assembled thereto in a plumbing assembly constructed on the fixture of the present invention.

Figure 7:
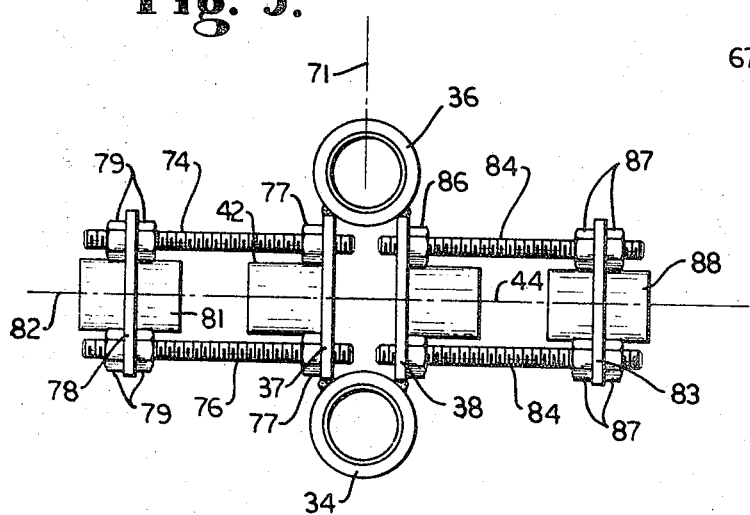

FIG. 7 is an enlarged side elevational view of a tube receiver fixture with extension rods thereon mounting additional tube receivers for construction of a plumbing assembly for back-to-back bathrooms, for example.

Figures 8, 9:
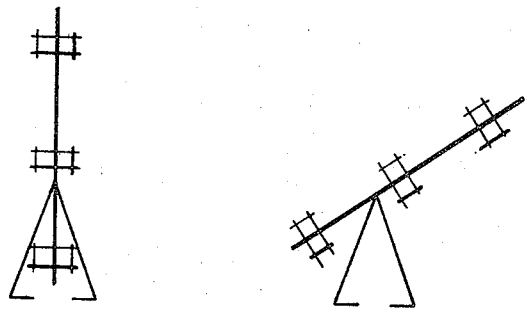

FIG. 8 is a small schematic side elevational view of the fixture of the present invention with extension rods on the various tube receivers.

FIG. 9 is a view like FIG. 8 but illustrating the pivotal feature of the assembly facilitating the plumbing assembly work.

DESCRIPTION OF THE PREFERRED EMBODIMENT

For purposes of an example, consider that it is desirable to provide the water supply lines as a prefabricated unit for a dwelling wherein a wall separates a kitchen from a bathroom. On the bathroom side of the wall there will be a bath tub with a tub filler and a shower head, a water closet, and a lavatory. On the other side of the wall there will be the kitchen sink. The particular embodiment of the invention described first herein will be arranged for prefabricating the water supply lines for these various plumbing fixtures.

Figure 1:
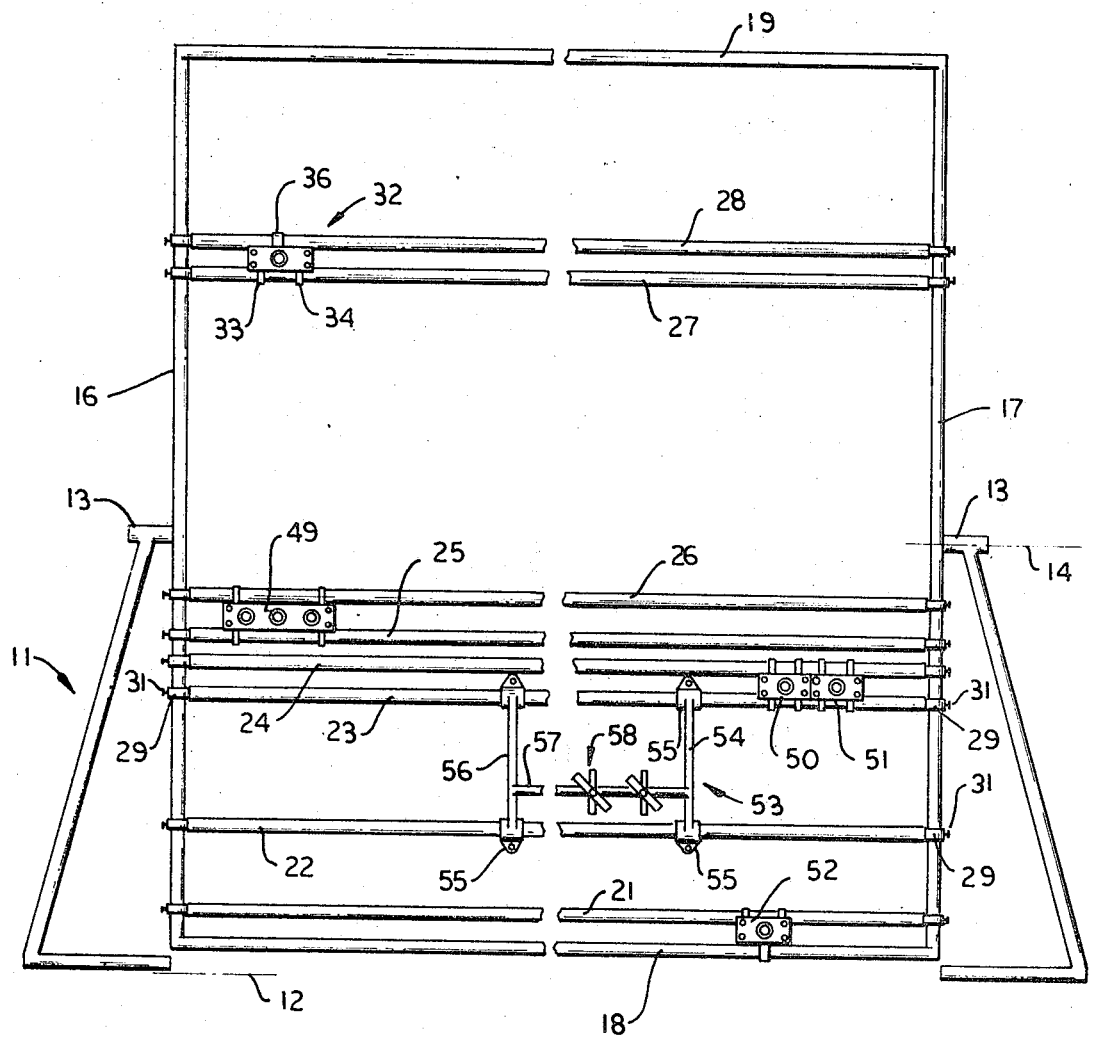
FIG. 1 is a front elevational view of a tube assembly fixture according to a typical embodiment of the present invention, the central portion being broken out to conserve space in the drawing.

Referring now to FIGS. 1 and 2, two A-shaped stands 11 are resting upon the floor 12, are horizontally spaced, and have bushings 13 therein having a colinear axis 14. A rectangular frame composed of parallel upstanding side members 16 and 17, and parallel horizontal cross members 18 and 19 is pivotally mounted to the two support stands 11 by pivotal connection of the side members 16 and 17 to the bushings 13. In the illustrated embodiment of the invention, the frame side and cross members are made of pipe of circular cross section which serve as guides for purposes which will be understood as the description proceeds.

Additional cross members 21, 22, 23, 24, 25, 26, 27 and 28 are disposed in the frame. Each of these cross members has two connector bushings thereon such as bushings 29 at the opposite ends of member 23. Each bushing has a set screw 31 therein. These bushings are slidingly received on the vertical side members 16 and 17 of the frame and permit placement of the cross member at any elevation desired. The cross member can be secured in place by tightening the set screws at the connector bushings thereon.

In addition to the lower and upper main cross members 18 and 19, respectively of the frame, each of the other aforementioned cross members is preferably made of pipe of circular cross section which can be of the same diameter. An example is 1.125 inch pipe. In the sizes involved in this example, the set screws might preferably be made of 5/16 inch diameter hexagonal head bolts, for convenience.

Referring now particularly to the cross members 27 and 28, a fixture 32 is mounted thereon by means of three bushings 33, 34 and 36. Details of this unit are better shown in FIGS. 3, 4 and 5.

Referring to FIGS. 3, 4 and 5, horizontally spaced plates 37 and 38 are welded to the three bushing units 33, 34 and 36. Each of these bushing units has a bearing insert 39 slidingly received on one or the other of the two guide pipes 27 and 28. A set screw or bolt 41 is provided in the bushing member 36 to affix the unit in any location desired along the length of the two guides 27 and 28. Cylindrical bushings 42 and 43 are secured to the plates 37 and 38, respectively, and have colinear axes 44. These receive a piece of tubing 46 through which the cold and hot water mixture will be supplied to a shower head designated schematically at 47. It should be pointed out here that the unit of the present invention is intended to facilitate assembly of the various water lines, but the shower head and the other plumbing fixtures would not be connected to these lines until after installation in a building wall. Therefore the shower head 47 in FIG. 5 is shown only for purposes of orientation and not to suggest that it would be connected to the pipe during the use of the assembly of the present invention. An additional feature of the tube receiver fixture of FIG. 3 is the inclusion of four apertures 48 therein. These are threaded apertures in both the plates 37 and 38 and are employed for extension rods according to a feature which will be described hereinafter.

Referring again to FIG. 1, in addition to the shower tube receiver fixture 32, similar units 49, 50, 51 and 52 are provided. The units 50, 51, and 52 can be identical to the unit 32 and are intended for the hot and cold water supply tubes for the lavatory fixture, and for the cold water supply tube for the water closet. The tube receivers for the lavatory are separate, in order to facilitate adjustment for the considerable variation which can occur in lavatories, depending on the sizes involved. The unit for the tub filler has three apertures, in contrast to the other units. Of course any number of apertures can be provided, depending upon the nature of the plumbing fixture to be accommodated.

As addition to the various tube receivers heretofore described, means are provided for the main supply lines to be supported for assembly. For this purpose a bracket 53 is provided including the side arm 54 connected to the guides 22 and 23 through removable half shell clamps 55, and the side arm 56 likewise connected to the same guides. Spring clamps 58 are provided at spaced locations along member 57 for connection of the horizontal hot and cold water lines thereto. The retainer bars 58A of these clamps are pivotable on the mounting bolts 58C out of vertically aligned relationship with bars 58B to release the tubes therefrom.

Just as the various tube receivers are horizontally slidable on the guides therefor, so are the side arms 54 and 56 for the main supply lines horizontally slidable on the guides 22 and 23. This facilitates location of the clamps where desired depending upon the spacing of the various components.

Referring now to FIG. 6, the relationship of the fixture of the present invention to the plumbing assembled thereon can be better appreciated. In order to facilitate the illustration and avoid confusion, portions are shown only schematically and others are omitted. Nevertheless the shower head tube receiver 32 is shown receiving the tube 46 which is to supply the mixture of hot and cold water to the shower head. Similarly a portion of the tub filler pipe receiver 49 is shown with the tube 61 received therein and connected through elbow 62 and line 63 to the main hot water line 64 mounted to clamps 58 of FIGS. 1 and 2. Tube 61 would supply hot water to the valve for the tub filler. The cold water tube to the tub filler cold water valve is not shown, in order to avoid confusion in the drawing. However, the cold water line 66 is shown connected through tube 67 and elbow 68 to the tube 69 received in the receiver 52. Tube 69 would supply cold water to the water closet.

Note that just as in FIG. 2, all of the tube receivers are in a common plane, this being the plane of the frame and containing the pivotal axis 14 of the frame. This plane is designated by the reference numeral 71 in FIG. 6. A line designated by reference numeral 72 is drawn in FIG. 6 and, whereas plane 71 might be the bathroom wall surface, so might line 72 designate the kitchen wall surface. Note then that by the use of the assembly fixture of the present invention, the plumber would typically work in an area extending from plane 71 toward plane 72. Plumbers are accustomed to working this way with respect to a building wall, so the use of the present invention does not involve any re-education or re-orientation of the plumber.

It may be remembered that the clamps 58 are employed to secure the main hot and cold water lines in vertically spaced relationship to each other to supply the various plumbing fixtures. The tubing for the kitchen sink can also be mounted to these lines during assembly of the plumbing unit, and that for the cold water to the kitchen sink is designated by reference numeral 73 in FIG. 6. A suitable holder for the tube 73 while it is being soldered to the other tubing associated therewith, can be connected to either of the guides 23 or 24 of FIG. 1.

It was mentioned above with reference to FIGS. 3, 4 and 5, that the apertures 48 are threaded and have a useful purpose. There are instances when it will be desired to prefabricate plumbing for installation in walls other than those where a bathroom is on one side and a kitchen sink is on the other. For example, many installations require bathrooms back-to-back. It is most convenient in such instances to have the bath tubs back-to-back, and the same treatment for lavatories and water closets. In that event, the apparatus of the present invention can serve perfectly to facilitate the prefabrication of the necessary plumbing. It is done by employing extension means on the various tube receivers. An example is illustrated in FIG. 7 for the shower supply tube fixture 32. In this instance, however, eight extension rods are provided, four on each of the plates 37 and 38. Rods 74 and 76 are threaded rods approximately eight inches long and threadedly received in plate 37. They are affixed in place by the locknuts 77.

A plate 78 of the same face dimensions as plate 37 is provided with four apertures therein freely received on rods 74 and 76 and their counterparts which are also affixed to plate 37 and horizontally spaced from rods 74 and 76. The position of plate 78 on the rods is determined by the location of the nuts 79 on the rods. This plate 78 has a cylindrical bushing 81 thereon having its axis 82 colinear with the axis 44 of the two bushings in the tube receiver 32.

Referring further to FIG. 7, a plate 83 is received on four extension rods 84 threadedly received in the four apertures of plate 38 which are aligned with the apertures in plate 37. These rods 84 are locked in position by the nuts 86. Similarly the location of the plate 83 on the rods is determined by the location of the nuts 87. The plate 83 has the bushing 88 thereon with its cylindrical axis colinear with axis 44.

The provision of the two plates 83 and 78 on the extension rods serve to provide tubing receivers in horizontally spaced relationship such that they can be used in the assembly of a plumbing network for installation in a wall separating two bathrooms. Considering the line 71 to represent the plane of the frame and the guides in the plumbing assembly fixture, if the hot and cold water supply pipes are to be disposed on the same side thereof as in FIG. 6, for example, then it is likely that the plate 83 will be located somewhat closer to the plane 71 than will be the plate 78. This is assuming that the length of the horizontal runs to the plumbing fixtures would be the same on both sides of the wall.

FIG. 8 shows, on a small scale, and schematically as well, thet frame with extenders thereon for the shower head tubes, the tub filler tubes, the lavatory, and the water closet.

FIG. 9 is an illustration of the same frame tilted on its axis. The purpose of this is to make it easier for the plumber to work on the various tubing components during the assembly thereof. For example, the water closet fixture, being near the floor, is less convenient to work on when in that position than it is if raised to a normal working height for a plumber who might either be seated or standing. The pivotal mounting of the frame of the present invention, makes it easy to raise this portion of the assembly to the best and most convenient working height for the plumber or pipe fitter.

It has been mentioned herein that the horizontal and vertical members of the frame are typically made of pipe, and that the horizontal cross members also are made of pipe. Usually it is 1.50 inch diameter steel pipe for the frame members, and 1.125 inch diameter steel pipe for the intermediate cross members. Other sizes might also be used. It is also possible that solid rods of circular cross section would be used and it is also possible that guides of cross sections other than circular might be used. At the moment, the illustrated embodiment seems the preferable approach.

Because of the symmetrical construction of the fixture of the present invention, the plumber can work from either side of the frame. That is to say he can work in front of it or behind it. He can make mirror images by working on opposite sides of the frame. For example, for a bathroom wherein the bath tub is to the left of the lavatory, the plumber will assemble the pipe to the right of the frame as shown in FIG. 2. For a bathroom wherein the bath tub is to be to the right of the lavatory, he would assemble the pipe on the left hand side of the frame as pictured in FIG. 2. It should be understood, of course, that because of the horizontally slidable features of the various tube receivers and because of the fact that the tube receiver for each bathroom fixture is mounted to two horizontally extending guide tubes separate from the others, the elevations thereof can be varied considerably as desired and the tube receivers can be moved freely from side to side. In the case of the shower head tube receiver, it is normally vertically movable between distances less than and greater than six feet from the water closet tube receiver fixture. This would depend upon the desired height of the shower head and the nature of the particular fixture in the completed bathroom installation.

It should be understood that where the expression "tube" is used herein, it is used in a generic sense in contemplation not only of copper tubing of circular cross section, but also tubing of other material and cross sections, including but not limited to steel pipe, for example.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

The invention claimed is:

1. A tube assembly fixture comprising:
first and second parallel elongated guide means;
third elongated guide means transverse to said first and second guide means and guidingly received thereon;
fourth elongated guide means parallel to said third guide means and guidingly received on said first and second guide means;
a first tube receiver guidingly received on said third and fourth guide means and having a tube receiving aperture therein, the axis of said aperture being perpendicular to a plane containing said third and fourth guide means.

2. The fixture of claim 1 and further comprising:
clamping means on said third and fourth guide means and on said tube receiver to fix the locations thereof where desired with respect to said first and second guide means.

3. The fixture of claim 1 wherein:
said tube receiver includes a pair of plates parallel to each other and to a plane containing longitudinal axes of said third and fourth guide means, said plates being affixed to bushings slidingly received on said third and fourth guide means.

4. The fixture of claim 1 and further comprising:
a first group of extension members secured to said first tube receiver and extending therefrom parallel to said aperture axis;
a second tube receiver mounted to said extension members in spaced relation to said first receiver, said second receiver having an aperture therein with an axis parallel to said extension members.

5. The fixture of claim 4 wherein:
the axis of the aperture in said second receiver is colinear with the axis of said aperture in said first receiver, said fixture further comprising:
a second group of extension members secured to said first tube receiver and projecting therefrom in a direction opposite said first extension members;
and a third tube receiver mounted to the extension members of said second group in spaced relation to said first receiver, said third receiver having an aperture with an axis colinear with that of said first receiver.

6. The fixture of claim 1 and further comprising:
fifth and sixth elongated guide means guidingly received on said first and second guide means and parallel to and colinear with said third guide means and movable on said first and second guide means between positions less and greater than six feet from said third guide means;
a second tube receiver guidingly received on said fifth and sixth guide means and having a tube receiving aperture therein with an axis parallel to the axis of the aperture in the first-mentioned tube receiver and disposed for reception of a shower head tube, whereas said first-mentioned receiver is disposed for reception of a water closet supply tube.

7. The fixture of claim 7 wherein:
all of said guide means are pipes.

8. The fixture of claim 1 and further comprising:
a support stand, said first and second guide means being pivotally mounted to said stand for rotation on a horizontal axis for direct access to both sides of said receiver by said rotation to invert said first and second guide means.

9. The fixture of claim 8 and further comprising:
tube mounting means removably receivable and securable on guide means parallel to said third guide means, said tube mounting means including clamps with retainer bars pivotable between a tube retaining and tube releasing position, said tube mounting means being positionable in front of a plane containing said first and serond guide means, and then positionable behind said plane.

References Cited

UNITED STATES PATENTS

| | | | |
|---|---|---|---|
| 414,470 | 11/1889 | Hanika | 269—45 |
| 929,045 | 7/1909 | Stewart | 209—71X |
| 1,060,430 | 4/1913 | Crecelius | 269—71X |
| 2,679,872 | 6/1954 | Sutcliffe | 269—98 |
| 2,682,244 | 6/1954 | Fortner | 269—45 |
| 2,774,134 | 12/1956 | Smith et al. | 269—45 |
| 2,808,801 | 10/1957 | Ulrichs | 269—45 |
| 3,086,767 | 4/1963 | Boser | 269—45X |
| 3,192,614 | 7/1965 | Gardner, Sr., et al. | 29—200 |
| 3,277,556 | 10/1966 | Platt et al. | 29—200 |

THOMAS H. EAGER, Primary Examiner

U.S. Cl. X.R.

269—45, 71